US011951653B2

(12) United States Patent
Jeon et al.

(10) Patent No.: US 11,951,653 B2
(45) Date of Patent: Apr. 9, 2024

(54) CORE DRILL HAVING ONE TOUCH LOCK FUNCTION OF CORE BIT

(71) Applicant: DAESUNGGT CO., LTD., Daejeon (KR)

(72) Inventors: Byung-woo Jeon, Daejeon (KR); Byung-kwon Jeon, Daejeon (KR)

(73) Assignee: DAESUNGGT CO., LTD., Daejeon (KR)

( * ) Notice: Subject to any disclaimer, the term of this patent is extended or adjusted under 35 U.S.C. 154(b) by 519 days.

(21) Appl. No.: 17/414,397

(22) PCT Filed: Dec. 3, 2019

(86) PCT No.: PCT/KR2019/016924

§ 371 (c)(1),
(2) Date: Jun. 16, 2021

(87) PCT Pub. No.: WO2020/130423

PCT Pub. Date: Jun. 25, 2020

(65) Prior Publication Data

US 2022/0055251 A1 Feb. 24, 2022

(30) Foreign Application Priority Data

Dec. 17, 2018 (KR) ........................ 10-2018-0162998

(51) Int. Cl.
*B23B 45/00* (2006.01)
*B28D 1/14* (2006.01)

(52) U.S. Cl.
CPC .................................... *B28D 1/146* (2013.01)

(58) Field of Classification Search
CPC .............. B23B 45/003; B23B 51/0473; B23B 2240/36; B23B 2270/08
See application file for complete search history.

(56) References Cited

U.S. PATENT DOCUMENTS 4,148,593 A * 4/1979 Clark .................. B23B 51/0473 408/206
2007/0160435 A1 * 7/2007 Chao .................. B23B 31/1071 408/102
2016/0067794 A1 3/2016 Boske

FOREIGN PATENT DOCUMENTS

KR 100542363 B1 1/2006
KR 101653561 B1 9/2016
(Continued)

*Primary Examiner* — Alan Snyder
(74) *Attorney, Agent, or Firm* — Rabin & Berdo, P.C.

(57) ABSTRACT

Provided is a core drill having one touch lock function of a core bit, and particularly, new-conceptional technology of maintaining locking automatically during assembling a core bit and a decelerating unit, and releasing the locking easily, and the core drill conventionally disclosed had problems that movement and separation of the core bit and the decelerating unit of the core drill often occur during operation, because there is no specific lock function in the state that the core bit and the decelerating unit are assembled, and in this disclosure of the present invention to solve the problems, there is provided new technology for automatically maintaining locking if releasing the locking after inserting a decelerating connector coupled to a core bit into a connection hole formed in a spindle in the state of releasing the locking by pressing the lock pin elastically installed in a lock housing fittingly installed outside the spindle.

6 Claims, 7 Drawing Sheets

(56) References Cited

FOREIGN PATENT DOCUMENTS

| | | | |
|---|---|---|---|
| KR | 10-1858106 | B1 | 5/2018 |
| KR | 101990801 | B1 | 6/2019 |

* cited by examiner

CORE DRILL HAVING ONE TOUCH LOCK FUNCTION OF CORE BIT

CROSS-REFERENCE TO RELATED APPLICATION

This application claims priority to Korean Patent Application No. 10-2018-0162998 filed on Dec. 17, 2018, the disclosure of which is hereby incorporated by reference in its entirety.

BACKGROUND

1. Field

Embodiments of the present invention relate to a new-conceptional technology of maintaining locking automatically during assembling a core bit and a decelerating unit, and releasing the locking easily.

2. Description of Related Art

Generally, a core drill is used to perforate concrete structure, rock and so on while a cylindrical-shaped core bit is rotated, or used to put out an object for strength test sampling from concrete structure, and is normally manufactured by including an electric motor installed inside a drill body, a decelerating unit connected to the axis of the electric motor, a rotation axis connected to the decelerating unit, and a cylindrical-shaped bit coupled with the front of the rotation axis.

The normal core drill is operated by a high-speed rotating core bit during the perforating operation to an object to be perforated such as concrete structure by the contact of the friction surface with the object to be perforated, but it has disadvantage of loss of long time taken to perforate the punched object such as mortar concrete or ferroconcrete having a high strength when performing the perforating operation only by the rotational force of the core drill simply.

Therefore, an operator must press the object to be perforated by applying force toward it during perforating, but physical fatigue of the operator is increased in this case, while causing the problems of decreasing work efficiency.

As related art of technology in order to solve the problems as above, there is disclosed Korean Patent Registration No. 1858106 entitled “CORE DRILL WITH EASY PIERCING OF CONCRETE WALL”.

The above technology provides effects of improving easing and simplicity for the perforating operation, decreasing the operation time, and reducing the fatigue of workers by applying pressure on a rotating core bit by using automatic pressure tool installed on the core drill.

However, the above technology causes problems of movement generation of the core bit or the decelerating unit during the operation because it has no special lock function in the state of mutually assembling the core bit and the decelerating unit, or being separated from each other.

Further, it also has problems that the end portion of the core bit shakes up and down while causing safety accidents in the case of cantilever due to the long length of the core bit, and components such as a core bit, a center support rod, and so on are easily broken.

Further, it also has problems that the compatibility is decreased because it cannot be applied to actuators directly as it is which is normally available in markets because it is necessary to assemble an axis holder having a polygonal-shaped power force axis separately formed to be rotationably installed after removing an axis holder having a motor axis formed thereon.

PRIOR ART DOCUMENTS

Patent Documents (Patent document 1) 1. Korean Patent Registration No. 10-1858106

SUMMARY

Embodiments of the present invention provide a technology in order to solve the above problems as described above, by pressing a lock pin elastically installed in a lock housing which is fittingly installed to the outer side of a spindle, so as to release the locking, and by releasing the lock pin after inserting a decelerating connector coupled to a core bit into a connection hole formed on the spindle, so that the locking can be maintained automatically.

Embodiments of the present invention provide a technology of preventing the end portion of the core bit from shaking up and down by forming a core bit shake prevention part fittingly installed outside a center support rod fixed on the concrete wall surface to be displaced near the inner periphery of the core bit.

Embodiments of the present invention also provide a technology of directly using an actuator which is available in markets by screw-coupling a polygonal-shaped power force axis to the motor axis of such an actuator.

Therefore, according to the embodiments of the present invention, if assembling a core bit and a decelerating unit, the shaking of the core bit or the decelerating unit can be prevented during the operation by making the locking maintained automatically, so as to provide effects of increasing the operation efficiency and preventing safety accidents, and after the operation is finished, the locking can be released by pressing the lock pin, and the core bit and the decelerating unit can be easily separated after releasing the locking, so as to make the usage thereof very simple and convenient.

Furthermore, according to the embodiments of the present invention, the core bit can be prevented from shaking up and down during operation by fitting a core bit shake prevention part having a size (diameter) near the inner diameter of the core bit into the center support rod, so as to prevent generation of safety accidents, and the breakage of the core bit, the center support rod, and so on can be prevented, so as to provide an effect of improving their durability significantly.

Furthermore, without separately reprocessing a normally-available actuator or reassembling with a separate component, it can be used as it is just by screw-coupling a polygonal-shaped power force axis to a motor axis, and manufacturing costs can be saved, and the time for manufacturing can be shortened, so as to reduce its production costs, and since it can be used to any kind of actuators by assembling the decelerating unit, it shows high compatibility.

BRIEF DESCRIPTION OF THE DRAWINGS

The foregoing and other features and advantages of the present inventions will be apparent from the more particular description of preferred embodiments of the present inventions, as illustrated in the accompanying drawings in which like reference characters refer to the same parts throughout the different views. The drawings are not necessarily to scale, emphasis instead being placed upon illustrating the principles of the present inventions. In the drawings.

DETAILED DESCRIPTION OF THE EMBODIMENTS

Figure 1:
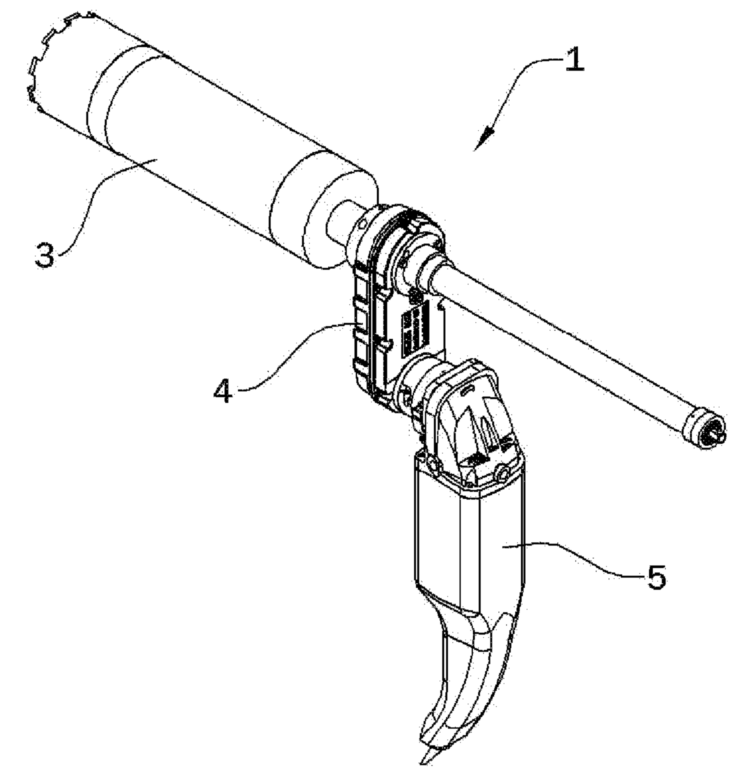
FIG. 1 is a perspective view showing one embodiment of a core drill on which the present invention is applied.
Figure 2:
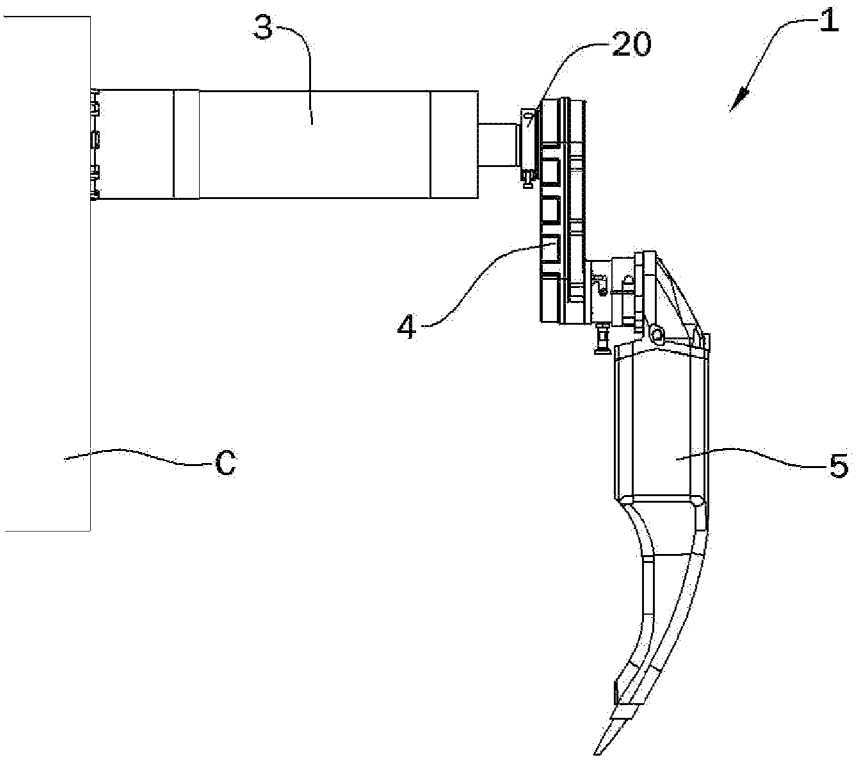
FIG. 2 is a front view showing the assembling state of the core drill according to one embodiment of the present invention.
Figure 3:
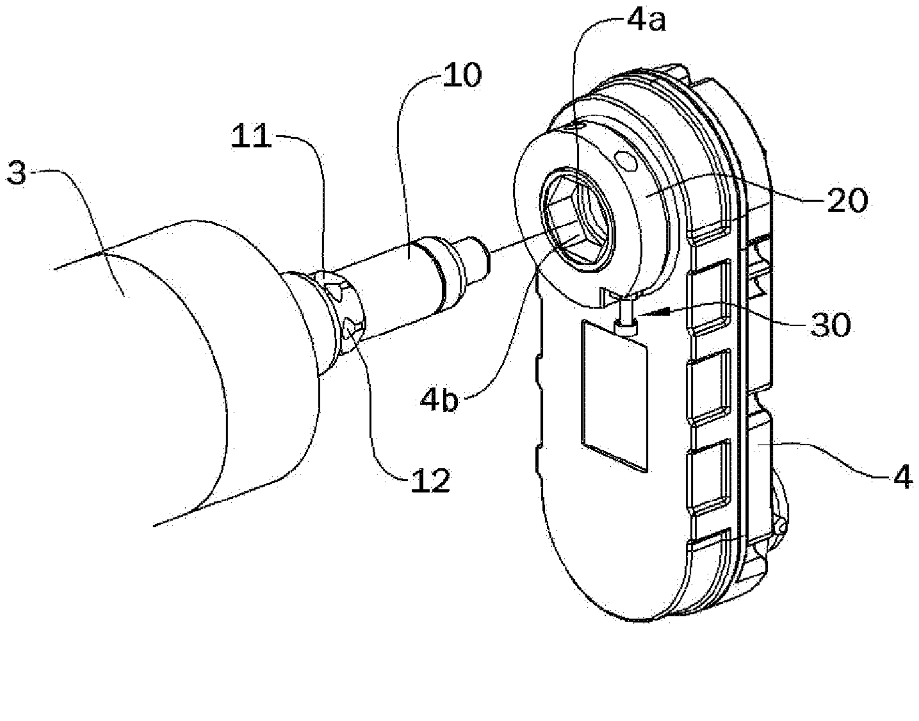
FIG. 3 is a perspective view showing that a core bit and a decelerating unit of the core drill are disassembled according to one embodiment of the present invention.
Figure 4:
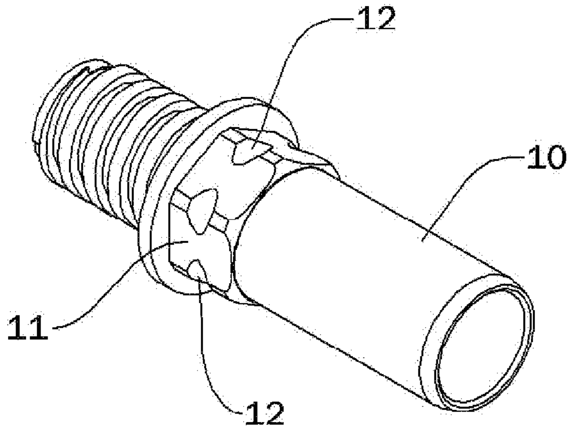
FIG. 4 is a perspective view showing a decelerating connector of the present invention according to one embodiment of the present invention.

Since exemplary embodiments of the present invention are provided only for structural and functional descriptions of the present invention, the present invention should not be construed as limited to the embodiments set forth herein. Thus, it will be clearly understood by those skilled in the art that the exemplary embodiments of the present invention may be embodied in different forms and include equivalents that can realize the spirit of the present invention. It should be understood, however, that it is not intended to limit the present invention to the particular forms disclosed, but on the contrary, the present invention is to cover all modifications, equivalents, and alternatives falling within the spirit and scope of the present invention as defined by the appended claims.

It will be understood that, although the terms first, second, etc. may be used herein to describe various elements, components and/or sections, these elements, components, and/or sections should not be limited by these terms. These terms are only used to distinguish one element, component or section from another ones. Thus, a first element, component or part discussed below could be termed a second element, component or part without departing from the teachings of the present invention.

It will be understood that when an element or part is referred to as being "connected to" or "coupled to" another element or part, it can be directly connected or coupled to the other element or part or intervening elements or parts may be present. In contrast, when an element is referred to as being "directly connected to" or "directly coupled to" another element or part, there are no intervening elements or parts present. Meanwhile, spatially relative terms, such as "between" and "directly between" or "adjacent to" and "directly adjacent to" and the like, which are used herein for ease of description to describe one element or feature's relationship to another element(s) or feature(s) as illustrated in the figures, should be interpreted similarly.

The terminology used herein is for the purpose of describing particular embodiments only and is not intended to be limiting of the present invention. As used herein, the singular forms "a", "an" and "the" are intended to include the plural forms as well, unless the context clearly indicates otherwise. Terms indicating directions of apparatuses or elements (such as "front", "back", "up", "down", "top", "bottom", "left", "right", and "lateral") are used to simplify description of the invention and do not represent nor mean that the apparatuses or elements have specific directions. It will be further understood that the terms "comprises" and/or "comprising," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless expressly defined in a specific order herein, respective steps described in the present invention may be performed otherwise. That is, the respective steps may be performed in a specified order, substantially at the same time, or in reverse order.

The present invention will now be described more fully hereinafter with reference to the accompanying drawings, in which exemplary embodiments of the present invention are shown.

The entire configurations of the core drill according to embodiments of the present invention in accordance with accompanied drawings can be roughly divided as three component parts including a decelerating connector 10, a lock housing 20, and a lock pin 30.

Now hereinafter, the present invention will be fully explained in more detail to be employed more easily.

Firstly, a core drill 1 of present invention may be composed of a center support rod 2, a core bit 3, a decelerating unit 4 and an actuator 5, and these are assembled in place before being used, and the configuration about these components is explained in more detail in the prior art of technology, so that further detailed explanation is omitted.

The decelerating connector 10 of the present invention is integrally screw-coupled to one side of the core bit 3, and a polygonal-shaped connection protrusion 11 is protrudingly formed on the outer peripheral side of the decelerating connector 10, and a locking groove 12 for locking is dently formed on each corner of the connection protrusion 11.

A spindle 4*a*, which is rotationably installed inside the decelerating unit 4, is installed to be partially exposed out of the decelerating unit 4, and the lock housing 20 is fitted into and integrally formed with the outer side of the externally-exposed spindle 4*a*, and a pin hole 21 is penetratingly formed inside the lock housing 20 from the outer peripheral side of its one side toward the outer peripheral side of the other side thereof.

Then, the lock pin 30 is elastically installed inside the pin hole 21 such that the lock pin 30 can be internally or externally exposed with the spring 50 interposed there between.

Herein, while the pin hole 21 is mutually communicated with a connection hole 4*b* of the spindle 4*a*, the lock pin 30 is partially exposed into the inner side of the connection hole 4*b*, and can be selectively fitted into a locking groove 12 formed on the decreasing connector 10.

Therefore, in order to mutually assemble the core bit 3 and the decelerating unit 4, if inserting the decelerating connector 10 of the core bit 3 into the polygonal-shaped connection hole 4*b* which is formed in the spindle 4*a*, the lock pin 30 is fitted into any one of the locking grooves 12, so as to automatically maintain the locking of the core bit 3 and the decelerating unit 4.

That is, assembling and disassembling of the core bit 3 and the decelerating unit 4 can be made easily and simply just by one touch operation of pressing the lock pin 30. That is, in the state of releasing the locking by pressing the lock pin 30 first, and if releasing the lock pin 30 after inserting the decelerating connector 10 of the core bit 3 into the connection hole 4*b* of the spindle 4*a*, the lock pin 30 comes to be fitted into the locking groove 12, so as to automatically maintain the locking.

Figure 8:
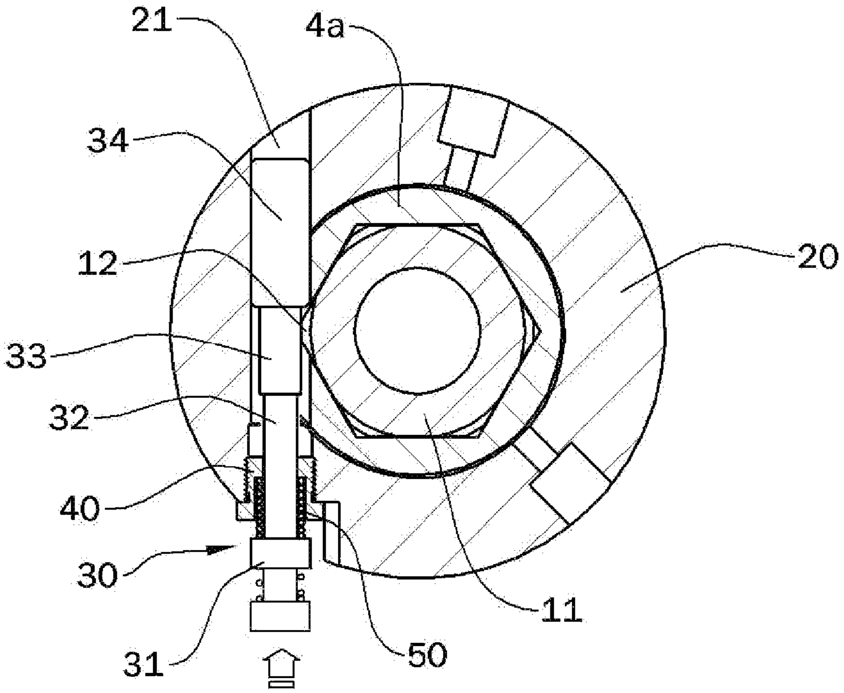
FIG. 8 is a sectional view of FIG. 6 taken along by the line of A-A of FIG. 6 and shows the locking release state of the lock pin.
Figure 9:
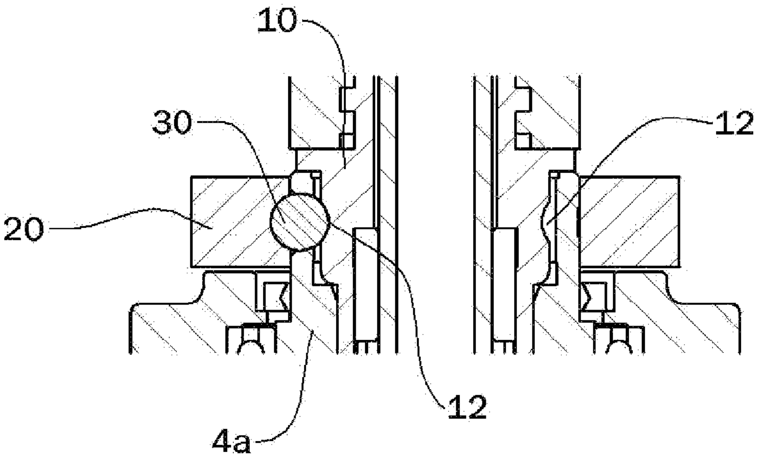
FIG. 9 is a sectional view taken along by the line of B-B of FIG. 7 according to one embodiment of the present invention.
Figure 10:
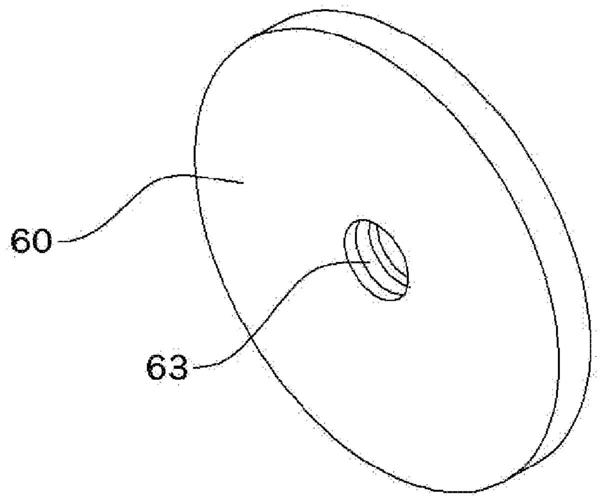
FIG. 10 is a perspective view of a core bit shake preventing unit according to one embodiment of the present invention.
Figure 11:
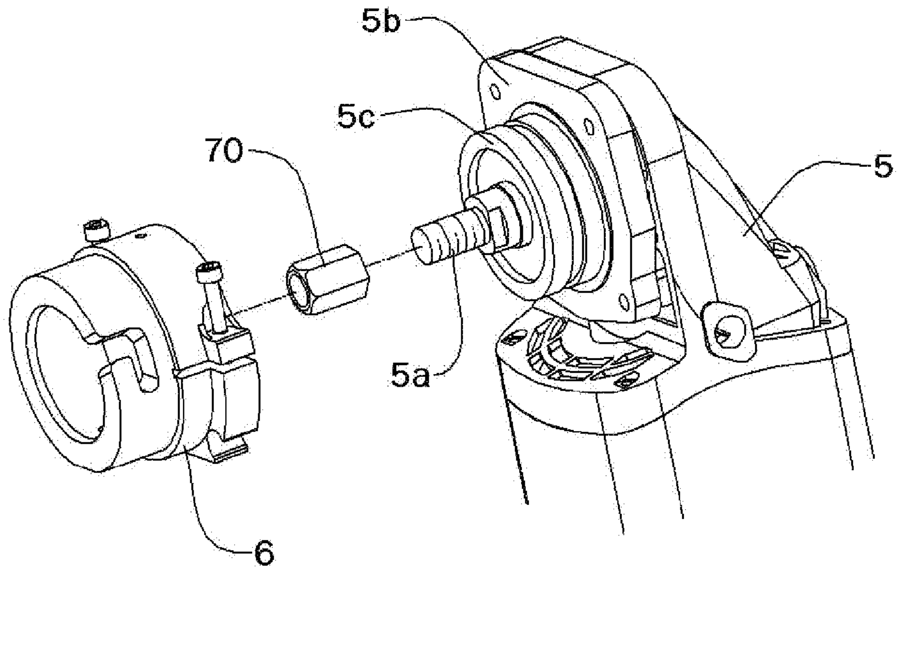
FIG. 11 is a separated perspective view of an actuator, a power force transfer unit and an adapter according to one embodiment of the present invention.

Further, if pressing the lock pin 30 in order to separate the core bit 3 and the decelerating unit 4, the lock pin 30 is released from the locking groove 12 as shown in FIG. 8, so as to release the locking. If releasing the decelerating connector 10 from the decelerating unit 4, it provides the effect of separating the core bit 3 and the decelerating unit 4 fast and simply.

Figure 7:
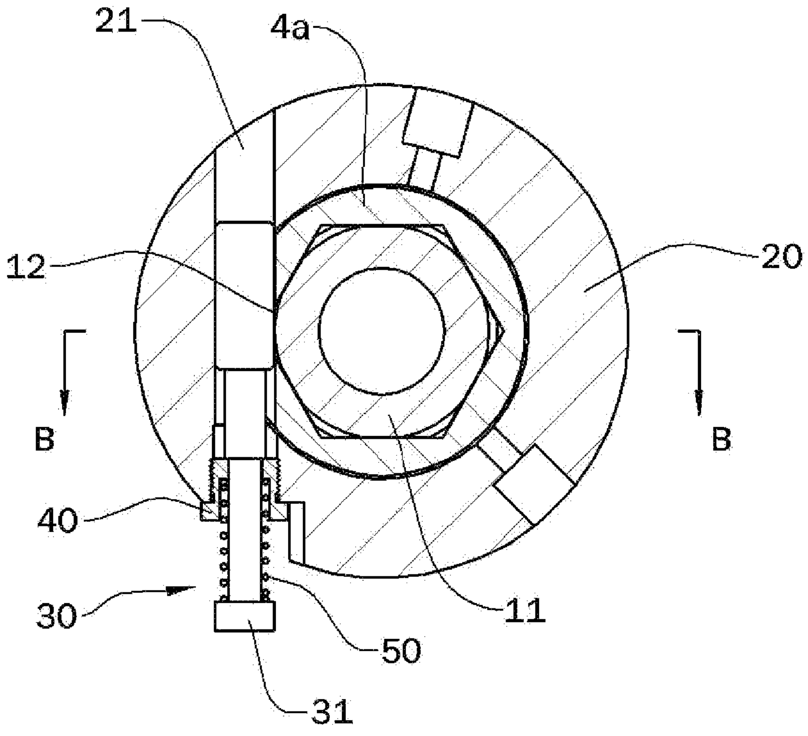
FIG. 7 is a sectional view of FIG. 6 taken along by the line of A-A of FIG. 6 and shows the locking state of a lock pin.

If explaining the lock pin 30 and the installation structure thereof as above in more detail, the lock pin 30 is formed such that a guide part 32 having a press protrusion 31 formed thereon, a trapped part 33 and a locking part 34 are formed with different diameter from each other, and sequentially formed with multistage structure as shown in FIGS. 7 and 8.

A spring holder 40, which has the functions of supporting the spring 50 and guiding the linear movement of the lock pin 30 easily, is fittingly installed in the linear end of the pin hole 21. While the guide part 32 penetrating the spring holder 40, it is fittingly installed into the pin hole 21, and while the trapped part 33 is caught by the spring holder 40, it prevents the lock pin 30 from separated outwards, and a spring 50 for providing elasticity to the lock pin 30 is elastically installed out of the guide part 32 between the trapped part 33 and the press protrusion 31.

Therefore, as long as not pressing the lock pin 30, while the lock pin 30 maintains its fixing state, it can maintain its locking state firmly while not displacing the locking groove 12, and upon the moment of releasing the pressed lock pin 30, the recovering force is provided so that it can be recovered to its original state.

Figure 12:
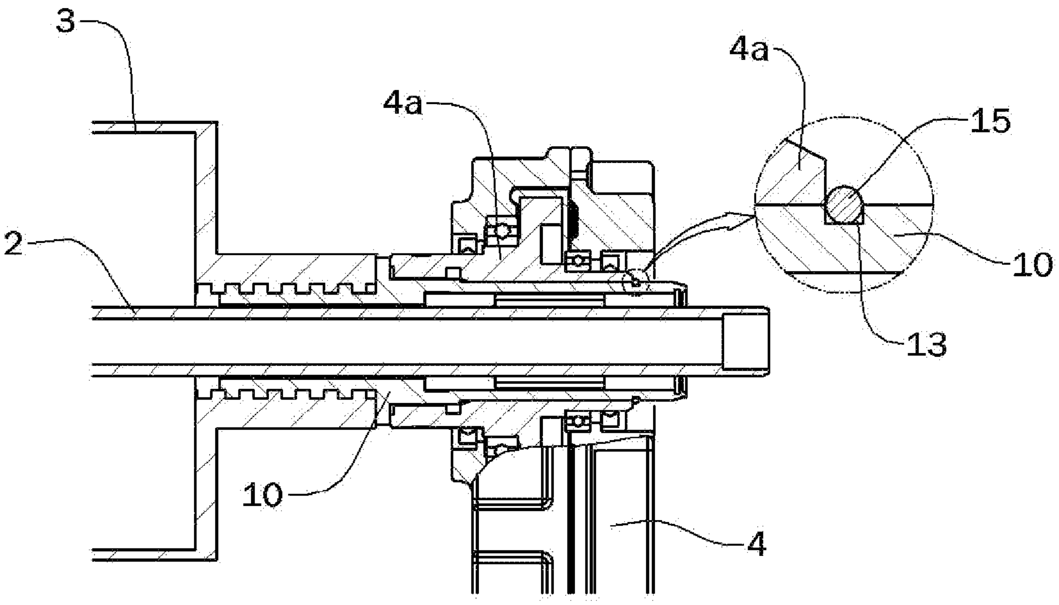
FIG. 12 is a front sectional view showing that a snap ring is installed in a decelerating connector according to one embodiment of the present invention.

Further, the present invention provides of maintaining the locking in the very simple way while not using the lock housing 20 and the lock pin 30, and in order to realize this, as shown in FIG. 12, if selectively inserting a snap ring 15 into a ring groove 13 formed on the outer peripheral side of the decelerating connector 10, the snap ring 15 is caught by the linear end of the spindle 4*a*, and can maintain the locking while the core bit 3 and the decelerating unit 4 are not separated from each other, but in order to release the locking in this case, it is disadvantageous that the snap ring 15 should be open by using another separate tool in order to release the locking.

Therefore, according to the present invention, new technology to effectively prevent sharp ends of the core bit 3 from shaking up and down like free end such as cantilever due to its long length is provided during perforating operation.

Figure 5:
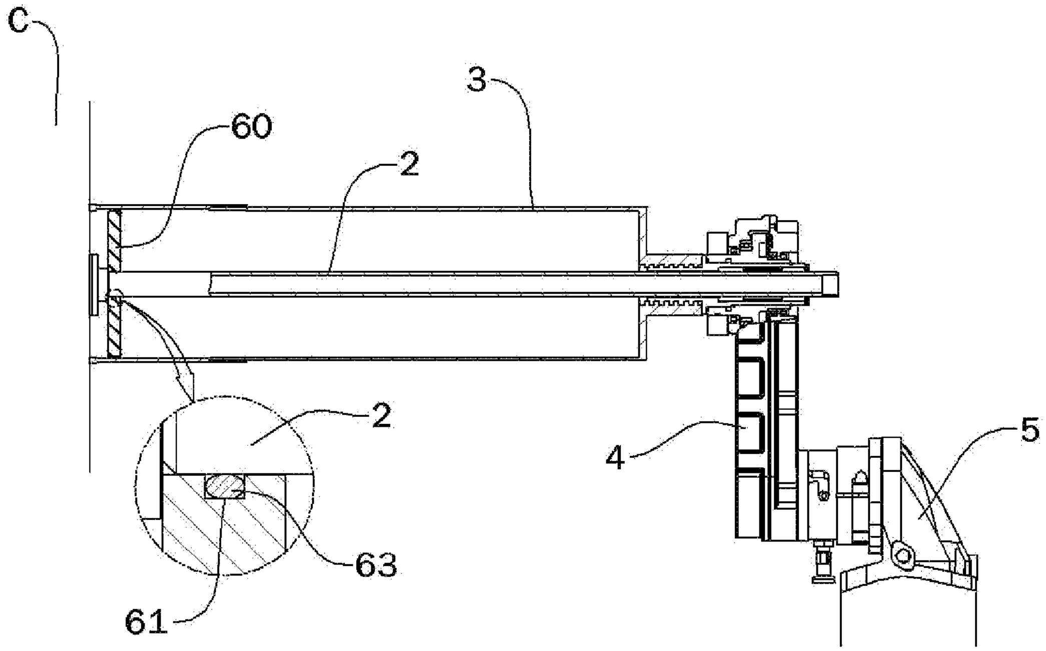
FIG. 5 is a front sectional view showing the assembling state of the core drill according to one embodiment of the present invention.
Figure 6:
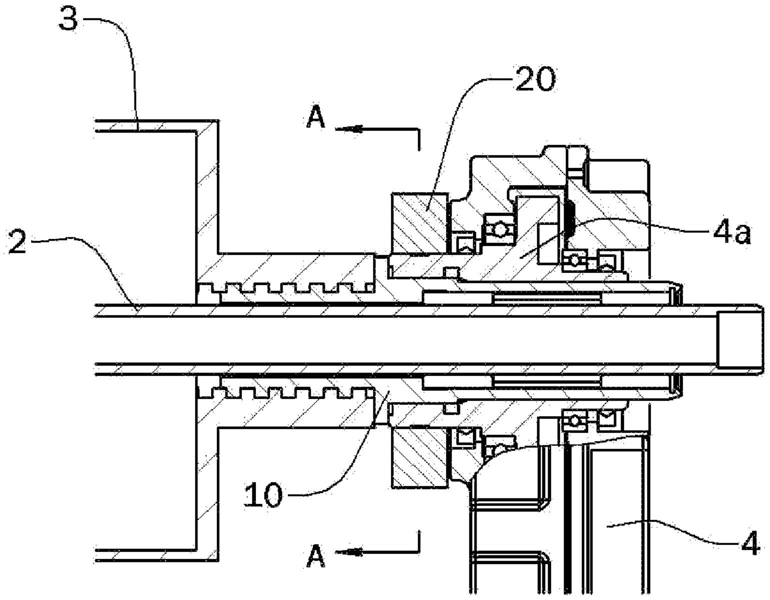
FIG. 6 is an enlarged sectional view showing the assembling state of the core bit and the decelerating unit according to one embodiment of the present invention.

By the structure as described above, in the state of being perforated by the center support rod 2 fixed to the object C to be perforated, when performing perforating operation by fitting and supporting the core bit 3, a core bit shake prevention part 60 is fitted and installed outside the center support rod 2 adjacent to the cutting end of the core bit 3 and near the inner diameter of the core bit 3 as shown in FIG. 5.

Herein, a plurality of the core bit shake prevention parts 60 are manufactured with various sizes in order to well match with the various sizes (diameter) of the core bit 3. If selecting and using the core bit shake prevention part 60 having the size well matched with that of the core bit 3, the shaking of the core bit 3 up and down during the operation can be effectively prevented, so as to prevent accident generation, and the breakdown of the core bit 3, the center support rod 2 and so on can be prevented, so as to provide specific effects of incredibly improving their durability.

Herein, the core bit shake prevention part 60 is formed with a ring groove 61 which is dently formed in its inner periphery, and a press prevention ring 63 which is formed of elastomer such as rubber and so on is insertedly formed in the ring groove 61. While the press prevention ring 63 is pressed by the outer periphery of the center support rod 2, the core bit shake prevention part 60 can be prevented from being pressed toward the actuator 5 along the center support rod 2 during the perforating operation, so as to prevent the shaking of the core bit 3 more firmly.

Further, according to embodiments of the prevent invention, a polygonal-shaped power transfer part 70 is integrally screw-coupled to a motor axis 5*a* of the actuator 5 which is assembled with the decelerating unit 4, and then, the power transfer part 70 is insertedly assembled into an input hole formed in the decelerating unit 4 in order to transfer power force. An adaptor 6 for integrally connecting the decelerating unit 4 is inserted into and coupled with a support protrusion 5*c* which is protrudingly formed on an axis holder 5*b* which supports the motor axis 5*a* rotatably, and thereby, without specific reassembling the actuator 5 which is normally found in the markets, or without adoption of separate different component parts, the decelerating unit 4 can be assembled and used as its original state, thereby to provide excellent compatibility.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this present invention as defined in the claims. In the claims, means-plus-function clauses are intended to cover the structures described herein as performing the recited function, and not only structural equivalents but also equivalent structures.

What is claimed is:

1. A core drill having a one touch lock function of a core bit, the core drill comprising:

a polygonal-shaped connection protrusion (11) coupled with one side of the core bit (3);

a decelerating connector (10) extending from the polygonal-shaped connection protrusion (11);

a plurality of locking grooves (12) formed on an outer periphery of the decelerating connector (10);

a decelerating unit (4);

a lock housing (20) integrally fitted to an outside of a spindle (4*a*) which is exposed outside the decelerating unit (4), and formed with a pin hole (21) penetrating from an outer peripheral side of the lock housing (20) to another outer peripheral side of the lock housing (20), and a lock pin (30) inside the pin hole (21) with a spring (50) interposed between the lock pin (30) and the pin hole (21), and fitted into a locking groove (12) of the decelerating connector (10), the decelerating connector (10) being configured to be fit into a polygonal-shaped connection hole (4*b*) formed on the spindle (4*a*), so as to maintain locking of the core bit (3) and the decelerating unit (4) automatically, wherein the lock pin (30) comprises a guide part (32) having a press protrusion (31) formed thereon, a trapped part (33) and a locking part (34), a width of the locking part (34) being greater than a width of the trapped part (33), and the guide part (32) penetrates a spring holder (40) installed on a linear end of the pin hole (21), and fitted into the pin hole (21), and the trapped part (33) is caught by the spring holder (40) and prevents the lock pin (30) from being separated from the lock housing (20), and the spring (50) is installed between the trapped part (33) and the press protrusion (31).

2. The core drill as claimed in claim 1, wherein the pin hole (21) is mutually communicated with the connection hole (4*b*) of the spindle (4*a*).

3. The core drill as claimed in claim 1, wherein the core drill is configured to automatically maintain locking while the lock pin (30) is fitted into the locking groove (12).

4. The core drill as claimed in claim 1, wherein the core bit (3) is fitted and supported while being penetrated by a center support rod (2) fixed to an object (C) to be perforated during a perforating operation, and a core bit shake prevention part (60) is outside the center support rod (2) and is adjacent to a cutting end of the core bit (3), and near an inner periphery of the core bit (3).

5. The core drill as claimed in claim 4, wherein the core bit shake prevention part (60) comprises a ring groove (61) formed on an inner periphery of the core bit shake prevention part (60) and a press prevention ring (63) formed to be fitted into the ring groove (61), and the press prevention ring (63) is pressed by an outer periphery of the center support rod (2), so as to prevent the core bit shake prevention part (60) from being pressed.

6. The core drill as claimed in claim 1, wherein an actuator (5) assembled with the decelerating unit (4) is formed such that a polygonal-shaped power transfer part (70) is integrally screw-coupled to a motor axis (5*a*), and the power transfer part (70) is fitted into an input hole formed on the decelerating unit (4).

* * * * *